United States Patent
Ryan (10) Patent No.: US 9,301,267 B2
(45) Date of Patent: Mar. 29, 2016

(54) RADIO OVER ETHERNET

(71) Applicant: Broadcom Corporation, Irvine, CA (US)

(72) Inventor: Timothy Ryan, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 144 days.

(21) Appl. No.: 13/763,426

(22) Filed: Feb. 8, 2013

(65) Prior Publication Data

US 2014/0036903 A1 Feb. 6, 2014

Related U.S. Application Data

(60) Provisional application No. 61/678,557, filed on Aug. 1, 2012.

(51) Int. Cl.
*H04J 3/06* (2006.01)
*H04W 56/00* (2009.01)

(52) U.S. Cl.
CPC ................................ *H04W 56/00* (2013.01)

(58) Field of Classification Search
None
See application file for complete search history.

(56) References Cited

U.S. PATENT DOCUMENTS

| | | | |
|---|---|---|---|
| 2009/0088172 A1* | 4/2009 | Lusky et al. | 455/446 |
| 2009/0141725 A1* | 6/2009 | Bedrosian | 370/392 |
| 2010/0177681 A1 | 7/2010 | Sahinoglu | |
| 2011/0130163 A1* | 6/2011 | Saban et al. | 455/517 |
| 2011/0135013 A1* | 6/2011 | Wegener | 375/241 |
| 2012/0176966 A1* | 7/2012 | Ling | 370/328 |
| 2012/0218986 A1* | 8/2012 | Bedrosian | 370/350 |
| 2012/0324270 A1* | 12/2012 | Magee | 713/400 |

OTHER PUBLICATIONS

"Open Base Station Architecture Initiative—Reference Point 4 Specification," Version 1.1, Open Base Station Architecture Initiative, 2004; pp. 1-10.
"Open Base Station Architecture Initiative—BTS System Reference Document," Version 2.0, Open Base Station Architecture Initiative, 2006; pp. 1-151.
"IEEE Standard for a Precision Clock Synchronization Protocol for Networked Measurement and Control Systems," IEEE Standard 1588-2008, IEEE Instrumentation and Measurement Society, Jul. 24, 2008; pp. 1-289.
"Timing Characteristics of a Synchronous Ethernet Equipment Slave Clock," ITU-T G.8262/Y.1362, International Telecommunication Union, Jul. 2010; pp. 1-34.
"Common Public Radio Interface (CPRI)—Interface Specification," CPRI Specification Version 5.0, Sep. 9, 2011; pp. 1-119.

* cited by examiner

*Primary Examiner* — Bob Phunkulh
(74) *Attorney, Agent, or Firm* — Sterne, Kessler, Goldstein & Fox P.L.L.C.

(57) ABSTRACT

A method of wireless communication utilizing a communication system that includes a baseband module that is in communication with a radio module via an Ethernet communication link. The method of wireless communication can include the synchronization of the internal reference clocks of the baseband module and radio module. A hierarchical arrangement can be used to synchronize the internal reference clocks with a grandmaster clock within the communication system. Further, packet transit calculations can be used to synchronize the internal reference clocks.

20 Claims, 6 Drawing Sheets

RADIO OVER ETHERNET

CROSS REFERENCE TO RELATED APPLICATIONS

This patent application claims the benefit of U.S. Provisional Patent Application No. 61/678,557, filed Aug. 1, 2012, entitled "Radio over Ethernet," which is incorporated herein by reference in its entirety.

FIELD

This application relates generally to wireless communication systems, and more particularly to wireless communication systems utilizing Ethernet as a communication link interface.

BACKGROUND

In wireless communication systems, wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including: amplitude modulation (AM), frequency modulation (FM), quadrature amplitude modulation (QAM), phase shift keying (PSK), quadrature phase shift keying (QPSK), and/or orthogonal frequency-division multiplexing (OFDM), and others.

In many wireless communication environments, one of the first or second wireless communication device functions as a base station that provides communication between user devices and a central communication infrastructure. In such a base station, a radio unit is typically positioned at a physically high point of a cellular tower for communication with user devices. However, a significant portion of signal processing actually takes place in a local or remote baseband processor. For example, the baseband processor may be located a significant distance from the radio unit at top of the tower (e.g., in a bunker underground at the bottom of the tower, or in a nearby communications facility).

In conventional base stations, the baseband module and the radio module communicate with one another via a communication link interface. For example, the Common Public Radio Interface (CPRI) provides a standardization for the interface to connect Radio Equipment Controllers (e.g., baseband module) and Radio Equipment (e.g., radio module). Alternatively, the communication link interface may be established utilizing the interface defined in the Open Base Station Architecture Initiative (OBSAI).

CPRI is described in detail in "Common Public Radio Interface (CPRI)—Interface Specification, Version 5.0," published Sep. 9, 2011, which is incorporated by reference in its entirety. OBSAI is described in detail in "Open Base Station Architecture Initiative—BTS System Reference Document, Version 2.0," and "Open Base Station Architecture Initiative—Reference Point 4 Specification, Version 1.1," both of which are incorporated by reference in their entirety.

In operation, the baseband module can control the radio module to communicate with one or more wireless devices via the communication link interface. For example, the baseband module can timestamp data to be transmitted and then provide the time stamped data to the radio module. The radio module can then transmit the data at the time specified in the timestamp. This cooperation between the baseband module and the radio module ensures that the data is transmitted at the time specified by the baseband module, and ultimately at the time specified by the service provider of the wireless communication environment.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

Figure 1:
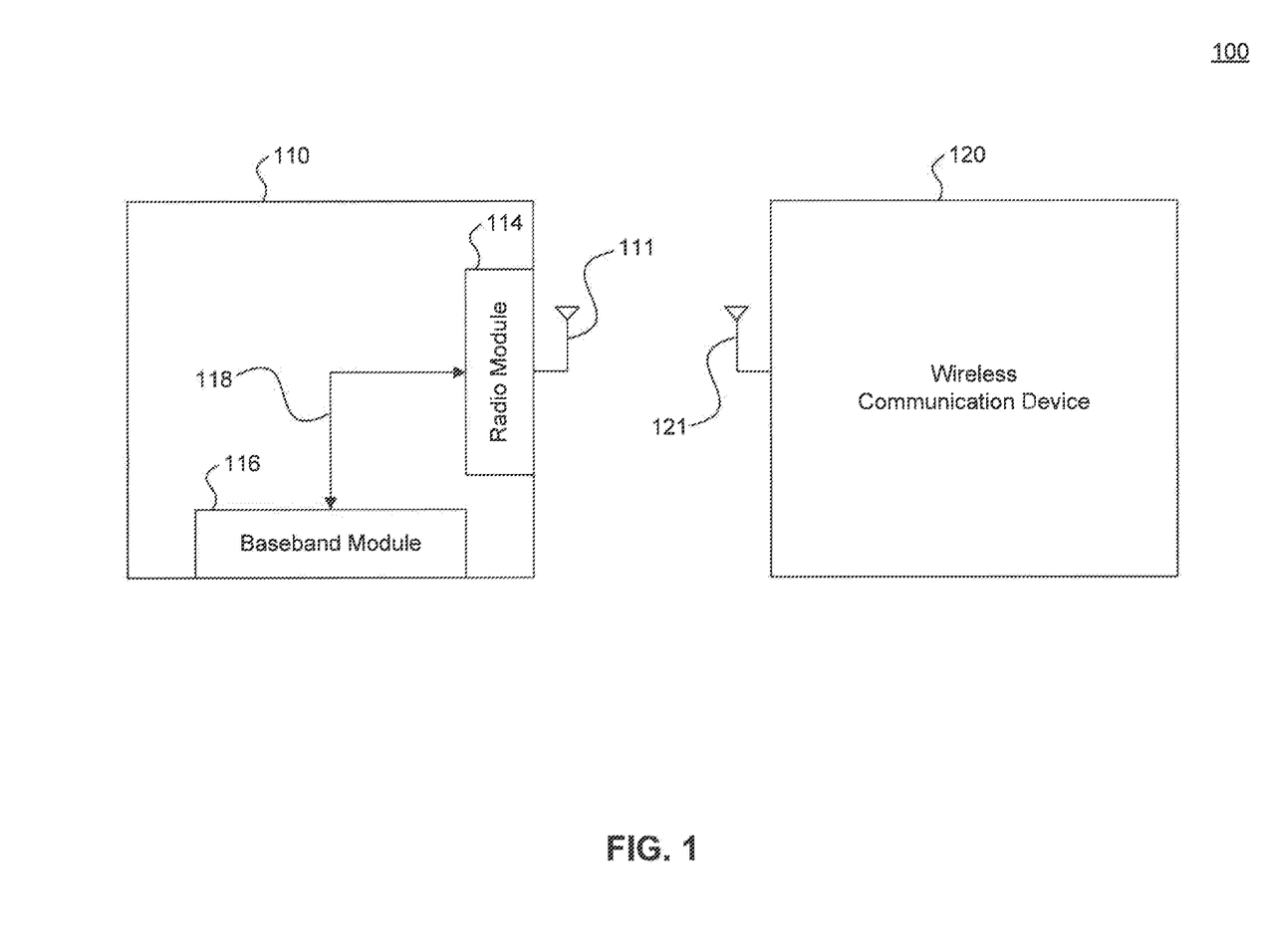
FIG. 1 illustrates an exemplary wireless communication environment in accordance with an exemplary embodiment of the present disclosure.

FIG. 1 illustrates an exemplary wireless communication environment 100. The wireless communication environment 100 provides wireless communication of information, such as one or more commands and/or data, between wireless communication devices. The wireless communication devices may each be implemented as a standalone or a discrete device, such as a base station, mobile telephone or mobile telephone peripheral device (e.g., Bluetooth headset), or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The exemplary wireless communication environment 100 includes a first wireless communication device 110 and a second wireless communication device 120. The wireless communication device 110 and the wireless communication device 120 are each capable of both wireless transmission and wireless reception utilizing one or more various wireless communication protocols, such as one or more various cellular protocols specified in, for example, the International Mobile Telecomunnications-2000 (IMT-2000) standard, developed by the 3rd generation partnership project (3GPP), and/or developed by the $3^{rd}$ generation partnership project 2 (3GPP2), WiMax (IEEE 802.16), Long Term Evolution (LTE), and the like. These various standards are all incorporated by reference in their entirety.

Although the exemplary discussion of the wireless communication environment 100 describes the first wireless communication device 110 and second wireless communication device 120, the wireless communication environment 100 is not limited thereto, and may include other wireless communication devices.

For purposes of this discussion, the first wireless communication device 110 may represent an exemplary embodiment of a base station, and the second wireless communication device 120 may represent an exemplary embodiment of a user equipment/subscriber station within the wireless communication environment 100.

The base station can include a radio module 114, a baseband module 116, and a communication link 118. The baseband module 116 performs various signal processing functions on outgoing signals before forwarding those signals to the radio module 114 for transmission over antenna 111, and further receives incoming signals received from the radio module 114.

The baseband module 116 and the radio module 114 can communicate with each other via the communication link 118. The communication link 118 my utilize, for example, the conventional Common Public Radio Interface (CPRI) or Open Base Station Architecture Initiative (OBSAI). In utilizing CPRI or OBSAI, accurate frequency and phase synchronization between the radio module 114 and baseband module 116 is typically necessary for communication.

After receiving outgoing signals from the baseband module 116, the radio module 114 performs additional processing on the outgoing signals and transmits the signals to the wireless communication environment 100 via antenna 111. Those skilled in the relevant art(s) will recognize that the antenna 111 may include an integer array of antennas, and that the antenna 111 may be capable of both transmitting and receiving radio signals.

The second wireless communication device 120 receives the signals from the wireless communication environment 100 via its antenna 121. Again, those skilled in the relevant art(s) will recognize that the antenna 121 may include an integer array of antennas, and that the antenna 121 may be capable of both transmitting and receiving signals. The second wireless communication device 121 may respond by transmitting signals back to the base station 110, where the base station (first wireless communication device 110) receives and processes the signals.

In an exemplary embodiment of the present disclosure, the communication link 118 can be implemented using the Ethernet standard. The Ethernet standard is further defined in, for example, Institute of Electrical and Electronics Engineers (IEEE) 802.3, which is incorporated by reference in its entirety. The communication link 118 utilizing the Ethernet standard can be referred to hereinafter as the Ethernet communication link 118.

The Ethernet standard does not, by itself, include measures to provide accurate frequency and phase synchronization between the radio module 114 and baseband module 116. Therefore, in utilizing the Ethernet standard for the communication link 118, frequency and phase synchronization can be established so as to provide a modified communication link interface that maintains the frequency and phase synchronization found in CPRI and OBSAI. A communication link 118 utilizing the Ethernet standard is discussed in more detail below with reference to FIG. 2.

Frequency Synchronization

Figure 2:
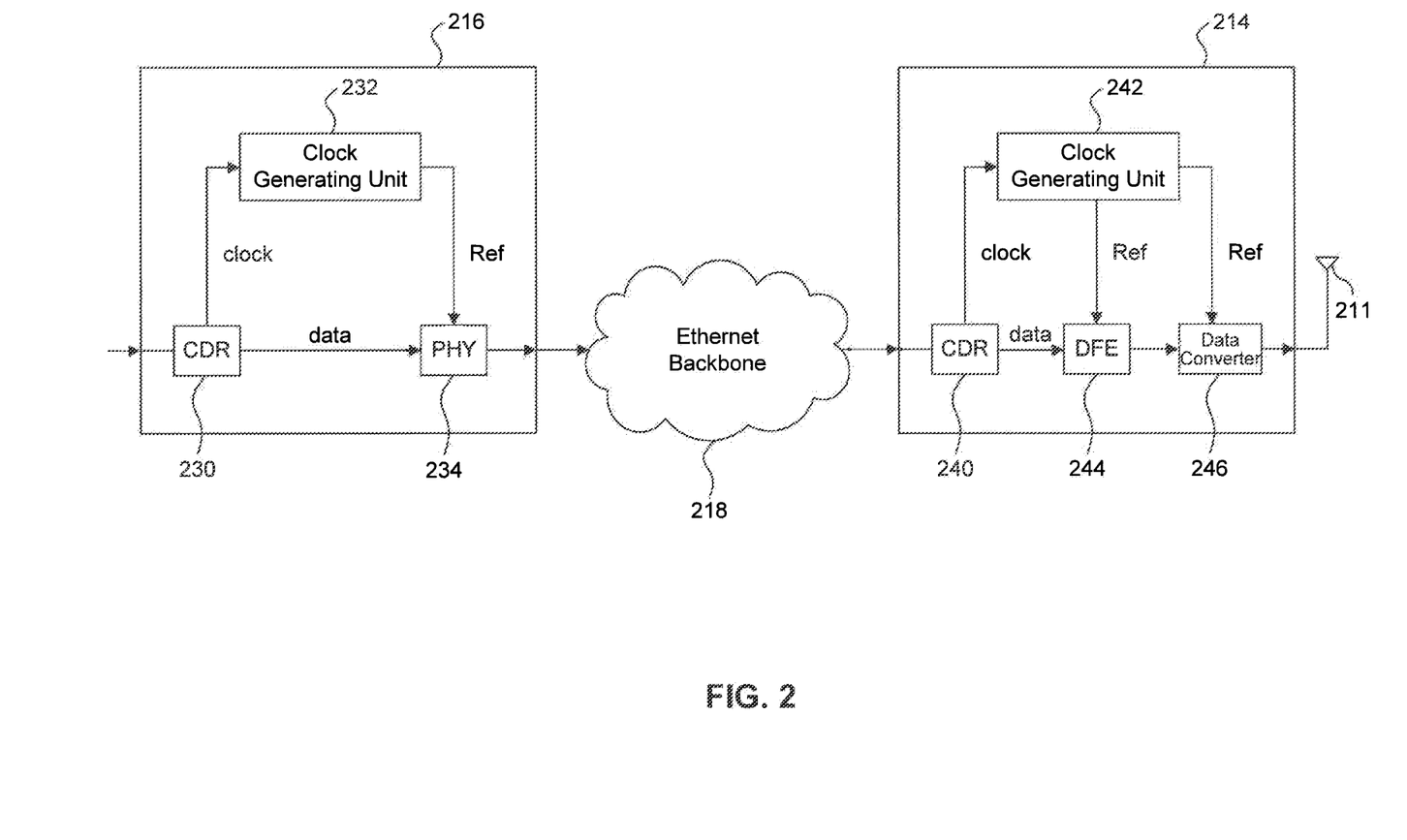
FIG. 2 illustrates a block diagram of an exemplary wireless communication device in accordance with an exemplary embodiment of the present disclosure.

FIG. 2 illustrates an exemplary wireless communication device 210 that can be implemented as part of the wireless communication environment according to an exemplary embodiment of the present disclosure. The wireless communications device 210 can be, for example, a base station in a cellular network. The wireless communication device 210 can include a radio module 214, a baseband module 216, and a communications link 218 that provides a communications interface between the radio module 214 and the baseband module 216. It should be appreciated that although the discussion of the exemplary embodiments illustrated in FIG. 2 describes the transmission of data by the radio module 214 to the wireless communication environment 100 via antenna 211, the wireless communications device 210 can be configured to perform the inverse functions described below during the reception of data transmissions from the wireless communication environment 100.

The baseband module 216 can include suitable logic, circuitry, and/or code that can be configured to perform various signal processing functions on outgoing signals before forwarding those signals to the radio module 214, and on incoming signals received from the radio module 214. For example, the baseband module 216 can perform various coding and modulation functions, frequency selection and conversion, filtering, etc., during signal transmission, and the inverse functions during signal reception.

The a radio module 214 can include suitable logic, circuitry, and/or code that can be configured to perform additional processing on outgoing signals received from the baseband module 216, and to transmit the signals to the wireless communication environment 100 via antenna 211. For example, the radio module 216 can perform various frequency conversion functions, filtering, and amplification during signal transmission and reception.

The communication link 218 can be configured to utilize the Ethernet standard, and can be referred hereinafter as the Ethernet communication link 218. The Ethernet communication link 218 can include various network components, including one or more switches, routers, or the like. In utilizing the Ethernet communication link 218, the internal reference clock frequencies of the baseband module 216 and radio module 214 can be synchronized with a grandmaster clock of a primary reference clock (PRC) module within the wireless communication environment 100 according to embodiments of the disclosure described herein.

In an exemplary embodiment of the present disclosure, a hierarchical master-slave architecture for clock distribution can be implemented to synchronize the internal reference clock frequencies of the devices within the wireless communication environment 100. The hierarchical master-slave architecture can be configured to distribute the grandmaster clock of the primary reference clock (PRC) module to the various modules of the wireless communication environment 100.

In particular, in the hierarchical master-slave architecture, a module configured as a slave recovers the clock from a corresponding module configured as a master utilizing, for example, a clock and data recovery unit (CDR). By recovering the clock from a preceding master module, the clock of each module can be traced back up the hierarchical master-slave architecture to the grandmaster clock of the PRC module located at the top of the hierarchical master-slave architecture.

For example, with respect to the connection of the PRC module to the baseband module 216, the baseband module 216 can be configured as a slave and receive a grandmaster clock from the PRC module configured as a master. Similarly, with respect to the connection of the baseband module 216 to the radio module 214 (via the Ethernet communication link 218), the baseband module 216 can be configured as a master while the radio module 214 can be configured as a slave. Additional radio modules 214 connected to the baseband module 216 can be configured to follow a similar hierarchical master-slave architecture.

In the above example, the baseband module 216 is directly connected to the PRC module in the hierarchical master-slave architecture (i.e., the baseband module 216 is located in the next subsequent level of hierarchical architecture). However, one or more intervening modules can be connected between the baseband module 216 and the PRC module. In this case, the intervening module(s) can be configured to follow a similar hierarchical master-slave architecture. For example, in the case where there is one intervening module, the PRC module and intervening module can be configured as a master and slave, respectively, for the connection between the PRC module and the intervening module. For the connection between the intervening module to the baseband module 216, the intervening module and the baseband module 216 can be configured as a master and slave, respectively. That is, the intervening module is configured as slave with respect to the PRC module, and as a master with respect to the baseband module 216. Similarly, in the case where the Ethernet communication link 218 includes one or more network components (e.g., switches, routers, etc.), these components can be configured to follow a similar hierarchical master-slave architecture.

In an exemplary embodiment, the CDR of a module functioning as a slave (i.e., slave module) can be configured to continuously recover the clock from a preceding module functioning as a master module (i.e., master module) in the hierarchical master-slave architecture. In this case, the master module can be configured to transmit idle characters during times at which no packet data is to be transmitted to the slave module. That is, the master module is configured to continuously transmit information (either data or idle characters) to the slave module. This configuration allows for the internal reference clock frequency of the slave module to remain synchronized with the internal reference clock frequency of the master module during times when no data packets are to be transmitted.

In an exemplary embodiment of the present disclosure, the synchronization of internal reference clock frequencies can be implemented using, for example, the Synchronous Ethernet (SyncE) standard. The Synchronous Ethernet standard is farther defined in International Telecommunication Union Telecommunication Standardization Sector (ITU-T) G.8262/Y.1362, "Timing Characteristics of a Synchronous Ethernet Equipment Slave Clock," published July 2010, which is incorporated by reference in its entirety.

With continued reference to FIG. 2, the baseband module 216 can also include a clock and data recovery unit (CDR) 230, a clock generating unit 232 and a physical layer device (PHY) 234. The CDR 230, clock generating unit 232 and PHY 234 can be configured to synchronize the internal reference clock of the baseband module 216 with the grandmaster clock of the PRC module utilizing the hierarchical master-slave architecture discussed above.

The CDR 230 can include suitable logic, circuitry, and/or code that can be configured to recover the reference clock signal and data from a received signal. In particular, the CDR 230 can output the recovered clock signal to the clock generating unit 232 while passing the data to the PHY 234 to be transmitted to the radio unit 214.

The clock generating unit 232 can include suitable logic, circuitry, and/or code that can be configured to receive the clock signal recovered by the CDR 230 and to generate an internal reference clock (Ref) for the baseband module 216 based on the received clock signal from the CDR 230. Further, the clock generating unit 232 can perform de-jitter processing (e.g., remove jitter) on the recovered clock signal so as to provide a cleaner generated internal reference clock (Ref). By utilizing the hierarchical master-slave architecture, the generated reference clock will be frequency locked to the grandmaster clock of the PRC module. The clock generating unit 232 can provide the generated reference clock (Ref) to PHY 234.

In an exemplary embodiment, the clock generating unit 232 can generate one or more reference clocks having different clock frequencies that have an exact ratiometric relationship. That is, although the clock frequencies of the various reference clocks may be different, the frequency ratio between the various reference clocks will remain constant so that the frequencies will be synchronized with respect to each other.

The physical layer (PHY) 234 can include suitable logic, circuitry, and/or code configured to transmit and receive bits of data over a physical link (e.g., Ethernet communication link 218). The PHY 234 can also be configured to convert the bit stream into a physical signal to be transmitted over the physical link and/or to convert a received physical signal into a bit stream. In particular, the PHY 234 can provide the electrical, mechanical, and procedural interface to a transmission medium (e.g., Ethernet communication link 218). Further, the PHY 234 can be configured to receive the reference clock (Ref) generating by the clock generating unit 232 so that the clock of the PHY 234 is frequency locked to the grandmaster clock of the PRC module.

The radio module 214 can also include a clock and data recovery unit (CDR) 240, a clock generating unit 242, a digital front-end (DFE) 244, and a data converter 246. The CDR 240 can be configured to synchronize the internal reference clock of the radio module 214 with the grandmaster clock of the PRC module utilizing the hierarchical master-slave architecture discussed above. In particular, the CDR 240 of the radio module 214 (acting as a slave) can recover the reference clock signal and data from signals received from the baseband module 216 (acting as a master) in the hierarchical master-slave architecture, where the signals received from the baseband module 216 have been previously synced to the grandmaster clock.

That is, the CDR 240 is similar to the CDR 230 of the baseband module 216, and can include suitable logic, circuitry, and/or code that can be configured to recover a reference clock signal and data from signal received from the baseband module 216. In particular, the CDR 240 can output the recovered clock signal to the clock generating unit 242 while passing the data to the DFE 244.

The clock generating unit 242 is similar to the clock generating unit 232 of the baseband module 216, and can include suitable logic, circuitry, and/or code that can be configured to receive the clock signal recovered by the CDR 240 and to generate an internal reference clock (Ref) for the radio module 214 based on the received clock signal from the CDR 240. Further, the clock generating unit 242 can perform de jitter processing (e.g., remove jitter) on the recovered clock signal so as to provide a cleaner generated internal reference clock (Ref). By utilizing the hierarchical master-slave architecture, the generated reference clock will be frequency locked to the grandmaster clock of the PRC module. The clock generating unit 242 can provide the generated reference clock (Ref) to the DFE 244 and/or the data converter 246.

In an exemplary embodiment, the clock generating unit 242 can generate one or more reference clocks having different clock frequencies that have an exact ratiometric relationship. That is, although the clock frequencies of the various reference clocks may be different, the frequency ratio between the various reference clocks will remain constant (e.g., the frequencies will be synchronized with respect to each other). For example, the DFE 244 may receive a reference clock at a first frequency and the data converter 246 may receive a reference clock at a second, different frequency. However, the ratio between the first and second frequencies will remain constant over time (i.e., the frequencies will exhibit an exact ratiometric relationship).

The digital front-end (DFE) 244 can include suitable logic, circuitry, and/or code configured to perform various signal processing, including various coding and modulation functions, frequency selection and conversion, filtering, compression, or the like, during signal transmission, and the inverse functions during signal reception. The DFE 244 can also be configured to receive the reference clock (Ref) generated by the clock generating unit 242 so that the clock of the DFE 244 is frequency locked to the grandmaster clock of the PRC module. Further, the DFE 244 can be configured output an equalized signal to the data converter 246.

The data converter 246 can include suitable logic, circuitry, and/or code configured to perform additional processing on signals received from the DFE 244 so as to convert the received signals into a wirelessly transmittable format, including analog-to-digital conversion (ADC) and digital-to-analog conversion (DAC), and to transmit the converted signals to the wireless communication environment 100 via antenna 211. Further, the data converter 246 can be configured to perform the inverse of the functions described above during the reception of data transmissions from the wireless communication environment 100 via antenna 211. The data converter 246 can also be configured to receive the reference clock (Ref) generated by the clock generating unit 242 so that the clock of the data converter 246 is frequency locked to the grandmaster clock of the PRC module.

Phase Synchronization

With continued reference to FIG. 2, and as discussed above, the hierarchical master-slave architecture for clock distribution can be implemented to synchronize the internal reference clock frequencies of the various devices within the wireless communication environment 100. Following synchronization of the clock frequencies between, for example, the baseband module 216 and the radio module 214, a phase offset between respective clocks of the baseband module 216 and radio module 214 can exist. In other words, although the clocks of the baseband module 216 and radio module 214 can be operating at the same (or substantially the same) frequency, a timing error (phase offset) may exist between the internal reference clock in the baseband module 216 and the internal reference clock in the radio module 214. For example, while operating at the same frequency, the internal reference clock for the baseband module 216 may be $T_{bm}$ while the internal reference clock for the radio module 214 may be $T_{rm}=T_{bm}\pm\Delta t$, where $\Delta t$ is the phase offset (e.g., timing error).

In an exemplary embodiment of the present disclosure, the wireless communication device 210 can also include suitable logic, circuitry, and/or code that can be configured to determine the phase offset $\Delta t$ utilizing roundtrip packet transit times through the physical link (e.g., Ethernet communication link 218). In particular, the baseband module 216 and/or the radio module 214 can include the suitable logic, circuitry, and/or code that can be configured to perform packet transit time determinations. As discussed in more detail below, the correct phase of the internal reference clock of the radio module 214 can be accurately determined utilizing the determined roundtrip packet transit time and the internal reference clock $T_{bm}$ of the baseband module.

For the purpose of this discussion, the baseband module 216 (e.g., acting as the master) can perform the determination of the phase offset $\Delta t$ utilizing the roundtrip packet transit time ($t_R$) and provide the phase offset $\Delta t$ to the radio module 214 (e.g., acting as the slave). However, the determination is not limited to the baseband module 216 and the determination can be made by the radio module 214 alone or in conjunction with the baseband module 216.

The baseband module 216 can determine the phase offset $\Delta t$ utilizing, a synchronization packet that is sent to, and returned by, the radio module 214 via the Ethernet communication link 218. In determining the roundtrip transit time, the synchronization packet is time stamped by the baseband module 216 and/or the radio module 214.

In an exemplary embodiment, and as discussed in more detail below, in determining the roundtrip transit time, the synchronization packet is (first) time stamped by the baseband module 216 upon transmission to the radio module 214, (second) time stamped upon receipt by the radio module 214, (third) time stamped upon transmission of the synchronization packet back to the baseband module 216, and (fourth) time stamped upon receipt by the baseband module 216.

For example, the baseband module 216 can timestamp the synchronization packet with the time the packet is sent to the radio module 214 ($T_{sent(BR)}$), where $T_{sent(BR)}$ is the moment in time measured at the baseband module 216 when the time synchronization packet is sent to the radio module 214. Upon receipt of the synchronization packet, the radio module 214 can time stamp the synchronization packet with the time the packet is received by the radio module 214 ($T_{rec(BR)}$), where $T_{rec(BR)}$ is the moment in time measured at the radio module 214 when the time synchronization packet is received by the radio module 214. The radio module can then timestamp the synchronization packet with the time a return packet is sent to the baseband module 216 ($T_{sent(RB)}$), where $T_{sent(RB)}$ is the moment in time measured at the radio module 214 when the time synchronization packet is sent back to the baseband module 216. Upon receipt of the synchronization packet, the baseband module 216 can time stamp a return synchronization packet with the time the packet is received by the baseband module 216 ($T_{rec(RB)}$), where $T_{rec(RB)}$ is the moment in time measured at the baseband module 216 when the time synchronization packet is received by the baseband module 216.

Utilizing the four timestamps $T_{sent(BR)}$, $T_{rec(BR)}$, $T_{sent(RB)}$, and $T_{rec(RB)}$, the phase offset Δt can be determined based on the following equation:

$$\Delta t = \frac{T_{rec(BR)} - T_{sent(BR)} - T_{rec(RB)} + T_{sent(RB)}}{2} \quad (1)$$

The phase offset Δt (e.g., timing error) can then be used to sync the internal reference clock of the radio module 214 with the internal reference clock of the baseband module 216. For example, the baseband module 216 can calculate the phase offset Δt and transmit the phase offset Δt to the radio module. The radio module 214 can then adjust the internal reference clock of the radio module 214 based on the value of the phase offset Δt. In particular, the internal reference clock of the radio module 214 ($T_{rm}$) can be synchronized by applying the phase offset Δt to the internal reference clock of the radio module 214 ($T_{rm}$). Following synchronization, the internal reference clocks of the baseband module 216 and the radio module 214 will satisfy the equation:

$$T_{rm} \pm \Delta t = T_{bm} \quad (2)$$

In another exemplary embodiment, the baseband module 216 may provide the four timestamps ($T_{sent(BR)}$, $T_{rec(BR)}$, $T_{sent(RB)}$, and $T_{rec(RB)}$) to the radio module 214, where the radio module 214 can then calculate the phase offset Δt and synchronize the internal reference clock of the radio module 214 with the internal reference clock of the baseband module 216 utilizing the phase offset Δt.

Alternatively, the radio module may initiate a similar synchronization as discussed above by transmitting a synchronization packet having a first timestamp to the baseband module 216. Second and third timestamps can then be performed by the baseband module 216 upon receipt and upon reply to the radio module 214. The radio module can then perform the fourth timestamp upon receipt of the reply from the baseband module 216. The radio module 214 can then determine the phase offset Δt utilizing the equation (1) above and synchronize the internal reference clock of the radio module 214 with the internal reference clock of the baseband module 216 to satisfy equation (2).

In an exemplary embodiment of the present disclosure, following the synchronization of the internal reference clock of the radio module 214 ($T_{rm}$) with the internal reference clock of the baseband module 216 ($T_{bm}$), the wireless communication device 210 can utilize time stamping of packets to facilitate the transmission/reception of data from/to the wireless communication device 210. For example, the timestamps can be utilized to indicate the time when to transmit data; to indicate the time in which data was received; and/or to identify dropped, duplicated, and/or out-of-order packets. To compensate for dropped or duplicated packets, the radio module 214 and/or the baseband module 216 can be configured to insert dummy packets or remove packets, respectively.

Further, in an exemplary embodiment, the timestamps can include absolute timestamps and/or truncated timestamps. Truncated timestamps can include a partial segment of the bits that are used to define absolute timestamps. For example, the absolute timestamps can be 16 bits while the truncated timestamps can include the lower 8 bits of the absolute timestamps. The truncated timestamps can be used in cases where the transmit/reception time of the packets is temporally close to the packet arrival times so as to avoid transmit/reception time ambiguities. It should be appreciated that the number of bits making up the absolute and truncated timestamps is not limited to the exemplary bit sizes discussed above, and the bit sizes can be any bit size as will be apparent to those skilled in the relevant art(s) without departing from the spirit and scope of the present disclosure.

As discussed above, the transmission of data from the wireless communication device 210 can be based on the time specified by the service provider of the wireless communication environment. In particular, the service provider can provide the data and time at which the data is to be transmitted to the baseband module 216 of the wireless communication device. The baseband module 216 can then provide the data and time at which the data is to be transmitted to the radio module 214 via the Ethernet communication link 218. The radio module 214 can then transmit the data at the specified time. For example, the baseband module 216 can be configured to time stamp packets prior to transmitting the packets to the radio module 214 via the Ethernet communication link 218. Because the timing of the baseband module 216 and the radio module 214 have been synchronized, the radio module 214 can be configured to accurately process and transmit the data packets at the times specified in the corresponding timestamps. In this case, the baseband module 216 can account for the transit time of the packets to the radio module 214 when determining the timestamps for packets to be transmitted to ensure that the packets are received by the radio module 214 at a time prior to their respective timestamps. In other words, the packets can be transmitted to the radio module 214 and buffered for some time period before being transmitted by the radio module 214.

Similar to the transmission of data, timestamps can be utilized during the reception of data from the wireless communication environment 100. In particular, the radio module 214 can timestamp data packets upon receipt of the data from the wireless communication environment 100 before transmitting the data to the baseband module 216.

In calculating the phase offset Δt that is used to synchronize the internal reference clocks of the baseband module 216 and the radio module 214, it is assumed that the outbound delay is equal to the return delay. Although this assumption is reasonable through the physical medium (e.g., Ethernet communication link 218), the delay through nondeterministic circuits and/or components (e.g., SEDRES, register/FIFO, etc.) within the wireless communication device 210 can vary such that the margin of error may become a factor in the calculation of the packet roundtrip transit time ($t_R$). The nondeterministic circuits and/or components refer to circuits and/or components in which the time delay through such circuits/components is variable.

To reduce the margin of error, the wireless communication device 200 can be configured to measure the delay through the nondeterministic circuits and/or components, which is discussed in more detail below with reference to FIG. 3.

Figure 3:
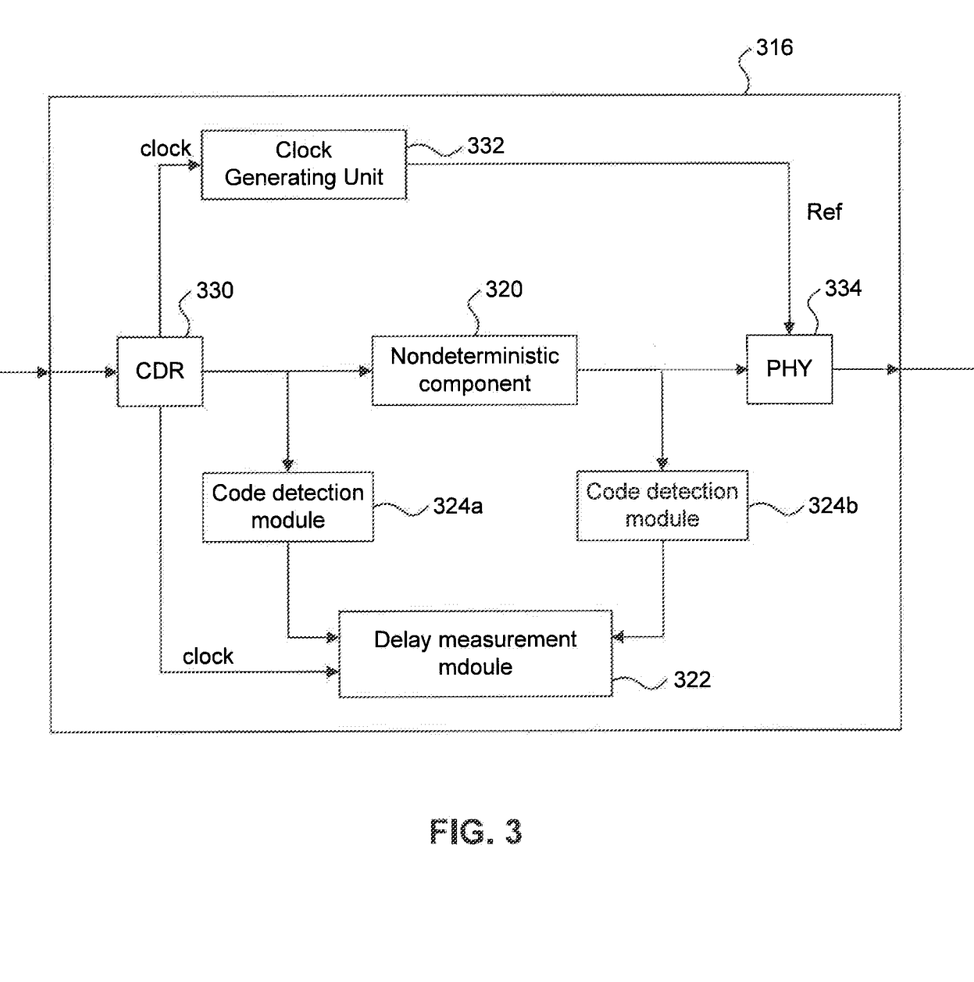
FIG. 3 illustrates a block diagram of an exemplary baseband module in accordance with an exemplary embodiment of the present disclosure.

FIG. 3 illustrates an exemplary baseband processor 316 that can be implemented as part of the wireless communication environment 100 according to an exemplary embodiment of the present disclosure. The baseband module 316 can include a clock and data recovery unit (CDR) 330, a clock generating unit 332 and a physical layer device (PHY) 334. The CDR 330, clock generating unit 332 and PHY 334 are similar to the CDR 230, clock generating unit 232 and PHY 234 of FIG. 2, so no further discussion is necessary. The baseband module 316 can also include nondeterministic circuits and/or components 320, a delay measurement module 322 and code detection modules 324a and 324b.

The code detection modules 324a and 324b can include suitable logic, circuitry, and/or code that can be configured to detect a predetermined code sequence within the data stream that is output from the CDR 330, and to indicate the presence the predetermined code sequence. For example, when the code detection module 324a detects the predetermined code sequence, the code detection module 324a can provide the delay measurement module 322 with a notification signal to notify the delay measurement module 322 of the presence of the code sequence. The code detection module 324b can operate in a similar manner.

The delay measurement module 322 can include suitable logic, circuitry, and/or code that can be configured to measure the delay through the nondeterministic circuits and/or components 320 based on notification signals received from the code detection modules 324a and 324b. For example, the delay measurement module 322 can measure the time between the receipt of the notification signal from the code detection module 324a and the receipt of the notification signal from the code detection module 324b. The measured delay ($t_{delay}$) will correspond to the delay amount through the nondeterministic circuits and/or components 320. By measuring the nondeterministic delay ($t_{delay}$), which is included in the packet roundtrip transit time ($t_R$), uncertainty associated with nondeterministic delay ($t_{delay}$) can be reduced, thereby providing a more accurate and consistent packet roundtrip transit time ($t_R$). By determining a more accurate and consistent one-way transit time ($t_O$), where $$t_O = \frac{t_R}{2},$$

a more accurate synchronization of the internal reference clocks of the baseband module 116 and radio module 114 of FIG. 1 can be achieved.

In an exemplary embodiment of the present disclosure, the synchronization of internal module times can be implemented using, for example, the Precision Time Protocol (PTP) standard. The Precision Time Protocol standard is further defined in IEEE 1588, which is incorporated herein by reference in its entirety.

Figure 4:
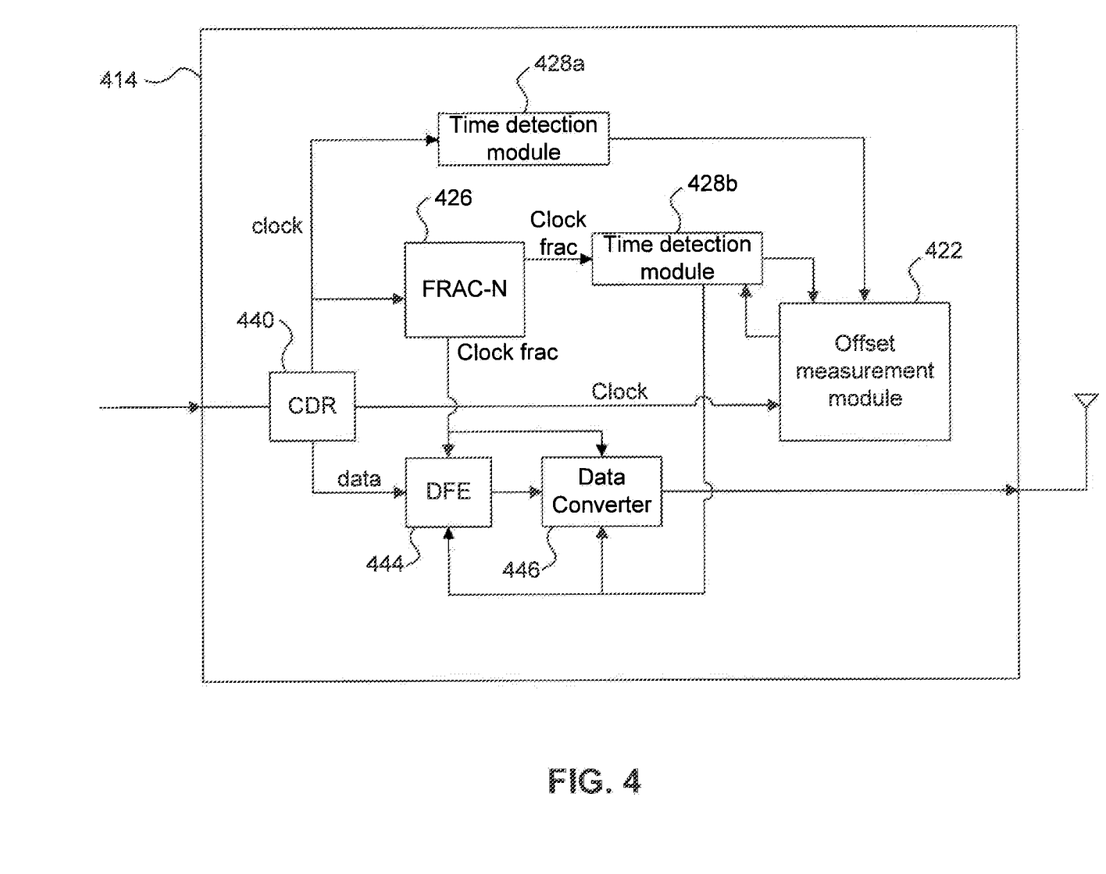
FIG. 4 illustrates a block diagram of an exemplary radio module in accordance with an exemplary embodiment of the present disclosure.

FIG. 4 illustrates an exemplary radio module 414 that can be implemented as part of the wireless communication environment 100 according to an exemplary embodiment of the present disclosure. The radio module 414 is similar to the radio module 214 of FIG. 2, and can include suitable logic, circuitry, and/or code that can be configured to convert the internal reference clock of the radio module 414 between various time bases (e.g., between various clock frequencies). For example, the radio module 414 can be configured to convert the internal reference clock that has been synchronized with the grandmaster clock of the PRC module to a clock having a higher or lower frequency. For example, a 10-gigabit Ethernet clock frequency (e.g., 156.25 MHz) recovered by the radio module 414 can be converted to a 3GPP clock frequency (e.g., 122.88 MHz, which is 32 times the base 3GPP frequency of 3.84 MHz). The conversion of internal reference clocks is discussed in more detail below with continued reference to FIG. 4.

The radio module can include a clock and data recovery unit (CDR) 440, a digital front-end (DFE) 444, and a data converter 446. These components have similar functionality to the corresponding components of FIG. 2, and therefore no further description is necessary. The radio module can also include a fractional/integer-N phase lock loop (PLL) (Frac-N PLL) 426, an offset measurement module 422, and time detection modules 428a and 428b.

The Frac-N PLL 426 can include suitable logic, circuitry, and/or code that can be configured to output one or more clock signals ($clock_{frac}$) having clock frequencies that are rational multiples of an input reference frequency of a reference clock signal that is output from the CDR 440. The Frac-N PLL 426 can include an oscillator whose clock is synchronized with a reference clock signal recovered by CDR 440.

In an exemplary embodiment of the present disclosure, the output clock signal ($clock_{frac}$) of the Frac-N PLL 426 can be provided to the time detection module 428b, the DFE 444, and the data converter 446.

In an exemplary embodiment of the present disclosure, the reference clock signal output from the CDR 440 can be provided to the offset measurement module 422. Alternatively, and not shown in FIG. 4, the offset measurement module 422 can utilize the output clock signal ($clock_{frac}$) of the Frac-N PLL 426 instead of, or in combination with, the reference clock signal output from the CDR 440.

The time detection modules 428a and 428b can include suitable logic, circuitry, and/or code that can be configured to detect a predetermined time from an input clock signal and output a flag indication at the predetermined time. That is, the time detection modules 428a and 428b can function as counters (e.g., timers that represent an absolute time) that output a flag indicator when a predetermined count (e.g., time) has been reached. For example, if the time detection module 428a is set to detect when the input clock signal has reached 09:30:00, the time detection module 428a will output a flag when the module detects that the time is 09:30:00. Similarly, the time detection module 428b can be configured to detect the same time (e.g., 09:30:00) from the output clock signal ($clock_{frac}$) of the Frac-N PLL 426 and also output a flag when the time is detected. Both flags can be provided to the offset measurement module 422 to determine a timing offset, which is discussed in more detail below.

The offset measurement module 422 can include suitable logic, circuitry, and/or code that can be configured to measure the timing offset between various time bases based on the notification flags received from time detection modules 428a and 428b. For example, the offset measurement module 422 can measure the time between the receipt of the notification flag from the time detection module 428a and the receipt of the notification flag from the time detection module 428b. The measured time offset can then be used to synchronize the internal reference clock operating at a second clock frequency that is generated by the Frac-N PLL 426 (e.g., the output clock signal ($clock_{frac}$)) with that of the grandmaster clock of the PRC module. That is, the offset measurement module 422 can be configured to translate an internal reference clock recovered by the CDR 440 and operating at a first frequency (e.g., 156.25 MHz), which was previously synched to the grandmaster clock of the PRC module by the baseband module 216/316, to a second reference clock (e.g., output clock signal (clock$_{frac}$)) operating at a second frequency (e.g., 122.88 MHz).

Further, the timing offset calculated by the offset measurement module 422 can be fed back to the time detection module 428b. The time detection module 428b can utilize the timing offset to adjust the internal count value so as to synchronize the absolute times represented by the respective count values of the time detection modules 428a and 428b.

In an exemplary embodiment, the time detection module 428b can be configured to provide a signal to the DFE 444 and the data converter 446 that instructs the DFE 444 and the data converter 446 to perform their respective processing at particular counts (e.g., times).

Figure 5:
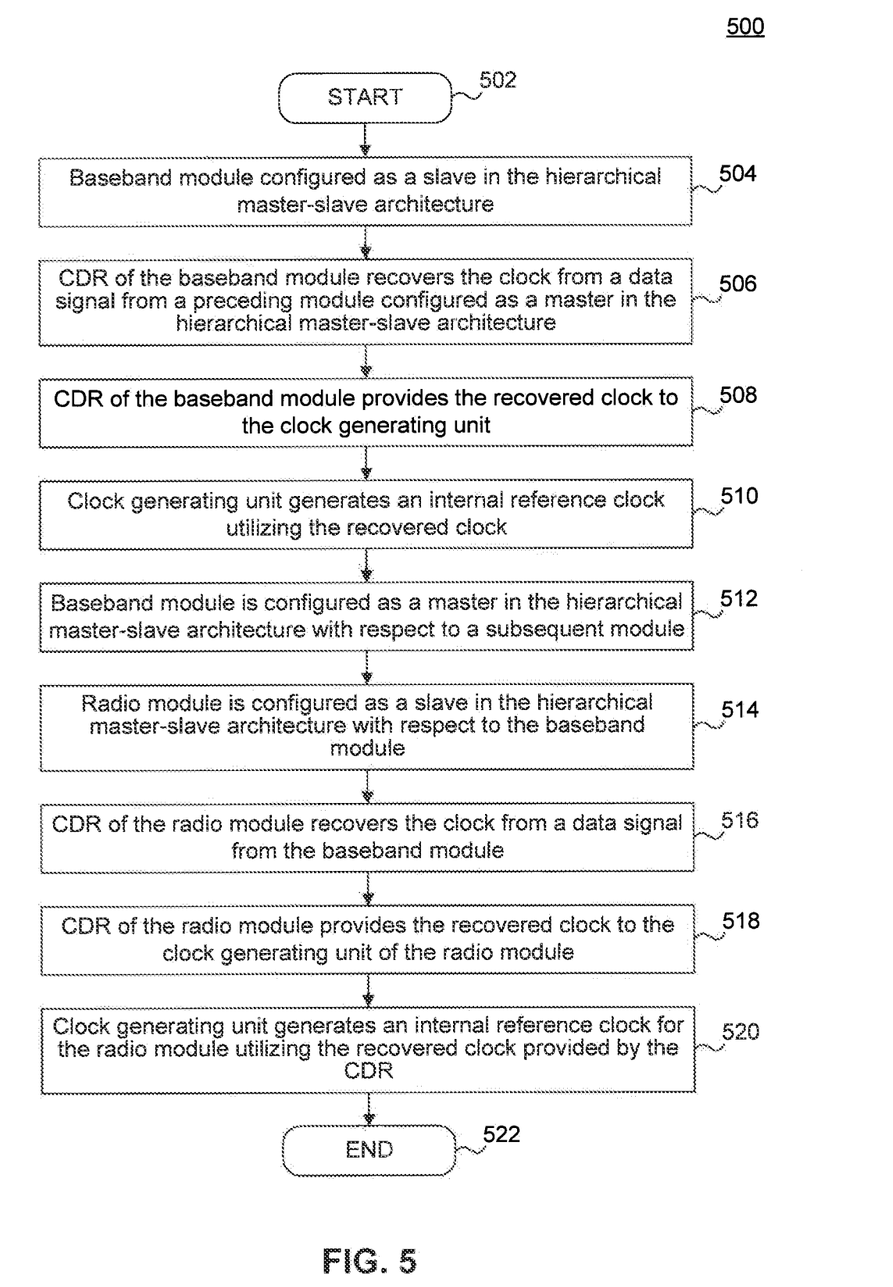
FIG. 5 illustrates a method of frequency synchronization in accordance with an exemplary embodiment of the present disclosure.

FIG. 5 illustrates a flowchart 500 of a method of frequency synchronization in an exemplary embodiment of the present disclosure. The method of flowchart 500 is described with continued reference to FIGS. 1-4.

The method of flowchart 500 begins at step 502 and transitions to step 504, where the baseband module 216 is configured as a slave in the hierarchical master-slave architecture with respect to a preceding module in the hierarchical master-slave architecture.

After step 504, the flowchart 500 transitions to step 506, where the CDR 230 of the baseband module 216 recovers the clock from a data signal from a preceding module configured as a master in the hierarchical master-slave architecture.

After step 506, the flowchart 500 transitions to step 508, where the CDR 230 of the baseband module 216 provides the recovered clock to the clock generating unit 232 of the baseband module 216.

After step 508, the flowchart 500 transitions to step 510, where the clock generating unit 232 generates an internal reference clock for the baseband module 216 utilizing the recovered clock provided by the CDR 230.

After step 510, the flowchart 500 transitions to step 512, where the baseband module 216 is configured as a master in the hierarchical master-slave architecture with respect to a subsequent module (e.g., radio module 214) in the hierarchical master-slave architecture.

After step 512, the flowchart 500 transitions to step 514, where the subsequent module (e.g., radio module 214) is configured as a slave in the hierarchical master-slave architecture with respect to the baseband module 216.

After step 514, the flowchart 500 transitions to step 516, where a clock and data recovery unit (e.g., CDR 240 of the radio module 214) recovers the clock from a data signal from the preceding module (e.g., the baseband module) configured as a master in the hierarchical master-slave architecture.

After step 516, the flowchart 500 transitions to step 518, where the CDR 240 of the radio module 214 provides the recovered clock to the clock generating unit 242 of the radio module 214.

After step 518, the flowchart 500 transitions to step 520, where the clock generating unit 242 generates an internal reference clock for the radio module 214 utilizing the recovered clock provided by the CDR 240. By utilizing the hierarchical master-slave architecture, the internal reference clock generated by the generating unit 242 can be traced back up the hierarchical architecture and be frequency locked with the grandmaster clock of the PRC module.

After step 520, the flowchart 500 transitions to step 522, where the flowchart 500 ends.

Figure 6:
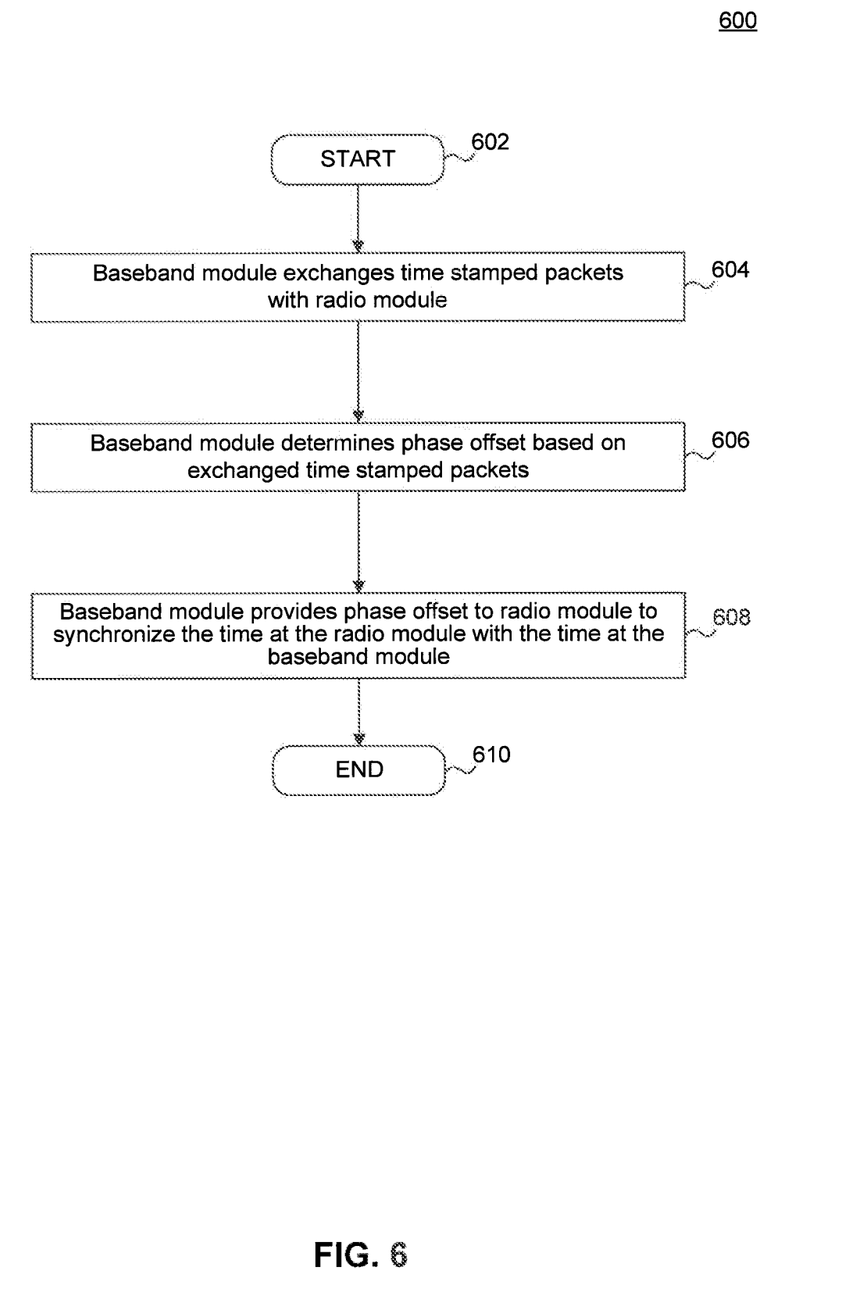
FIG. 6 illustrates a method of phase synchronization in accordance with an exemplary embodiment of the present disclosure.

FIG. 6 illustrates a flowchart 600 of a method of phase synchronization in an exemplary embodiment of the present disclosure. The method of flowchart 600 is described with continued reference to FIGS. 1-4.

The method of flowchart 600 begins at step 602 and transitions to step 604, where the baseband module 216 is configured determine a roundtrip packet transit time ($t_R$) through the physical medium (e.g., Ethernet communication link 218) utilizing the exchange of one or more time stamped packets with radio module 214.

For example, the baseband module 216 may transmit a time stamped packet to the radio module 214 through the Ethernet communication link 218. The timestamp represents the time the packet is sent to the radio module 214. Upon receipt, the radio module 214 can perform a second timestamp on the received packet with the time at which the packet is received by the radio module 214. The radio module 214 can then perform a third timestamp indicative of the time at which the packet is returned to the baseband module 216. Upon receipt of the returned packet, the baseband module 216 can perform a fourth timestamp with the time at which the packet is received by the baseband module 216. The baseband module can then determine the roundtrip transit time by calculating the difference between the various time stamped packets.

During the determination of the roundtrip time, the baseband module 216 can measure the time through any nondeterministic circuits and/or components. This measurement can be used to improve the accuracy of the roundtrip transit time as discussed in detail above.

After step 604, the flowchart 600 transitions to step 606, where the baseband module 216 can determine a phase offset Δt utilizing the exchanged time stamped packets as discussed in detail above.

After step 606, the flowchart 600 transitions to step 608, where the baseband module 216 can provide the phase offset Δt to the radio module 214 to synchronize the time at the radio module 214 with the time at the baseband module 216.

For example, the internal reference clock of the radio module 214 ($T_{rm}$) can be synchronized with the internal reference clock ($T_{bm}$) by applying the phase offset Δt to the internal reference clock of the radio module 214 ($T_{rm}$).

After step 608, the flowchart 600 transitions to step 610, where the flowchart 600 ends.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The Detailed Description of the exemplary embodiments has revealed the general nature of the present disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the present disclosure. Thus, the invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of wireless communication utilizing baseband circuitry in communication with radio circuitry via an Ethernet communication link, the method comprising:
    recovering a first clock frequency at the baseband circuitry from a grandmaster clock provided from primary reference clock (PRC) circuitry;
    synchronizing a frequency of a first internal reference clock of the baseband circuitry based on the recovered clock frequency;
    recovering a second clock frequency at the radio circuitry from a signal received over the Ethernet communication link from the baseband circuitry, the second recovered clock frequency being frequency locked to the grandmaster clock;
    synchronizing a frequency of a second internal reference clock of the radio circuitry based on the second clock frequency; and
    synchronizing a phase of the first internal reference clock and a phase of the second internal reference clock, a phase offset between the phase of the first internal reference clock and the phase of the second internal reference clock being determined by utilizing a time stamped packet sent by the baseband circuitry to the radio circuitry via the Ethernet communication link and returned by the radio circuitry to the baseband circuitry via the Ethernet communication link.

2. The method according to claim 1, wherein the first internal reference clock is synchronized to the grandmaster clock, and
    wherein the second internal reference clock is synchronized to the first internal reference clock through a hierarchical master-slave architecture.

3. The method according to claim 2, wherein the PRC circuitry is configured as a master and the baseband circuitry is configured as a slave with respect to the PRC circuitry in the hierarchical master-slave architecture; and wherein the baseband circuitry is configured as a master with respect to the radio circuitry that is configured as a slave in the hierarchical master-slave architecture.

4. The method according to claim 1, wherein the synchronization of the first internal reference clock and the synchronization of the second internal reference clock utilize the Synchronous Ethernet (SyncE) standard.

5. The method according to claim 1, wherein the synchronizing the phase comprises:
  transmitting the time stamped packet from the baseband circuitry to the radio circuitry that has been time stamped with a first timestamp representing a time at which the packet is transmitted to the radio circuitry;
  time stamping the time stamped packet upon receipt by the radio circuitry with a second timestamp representing a time at which the packet is received by the radio circuitry;
  time stamping the time stamped packet with a third timestamp representing a time at which the packet is to be sent from the radio circuitry to the baseband circuitry;
  transmitting the time stamped packet to the baseband circuitry;
  time stamping the time stamped packet upon receipt by the baseband circuitry with a fourth timestamp representing a time at which the packet is received by the baseband circuitry; and
  calculating the phase offset based on the timestamps.

6. The method according to claim 5, wherein the synchronization of the phase comprises:
  adjusting the phase of the second internal reference clock based on the phase offset.

7. The method according to claim 6, wherein the synchronization of the phase further comprises:
  measuring a delay through a nondeterministic component of at least one component from the baseband circuitry or the radio circuitry; and
  calculating the phase offset based on the delay.

8. The method according to claim 7, wherein the measuring of the delay through the nondeterministic component comprises:
  first detecting a predetermined code in a data stream before processing by the nondeterministic component,
  second detecting the predetermined code in the data stream after processing by the nondeterministic component, and
  measuring a time difference between the first detection and the second detection.

9. The method according to claim 8, wherein the first internal reference clock is synchronized to the grandmaster clock, and
  wherein the second internal reference clock is synchronized to the first internal reference clock through a hierarchical master-slave architecture.

10. The method according to claim 8, wherein the synchronization of the phase further comprises:
  translating the second internal reference clock from a current time base to another time base.

11. The method according to claim 10, wherein the translating comprises:
  determining a timing offset between the current time base and the other time base; and
  adjusting the other time base based on the determined timing offset.

12. The method according to claim 1, wherein the synchronizing the phase comprises:
  determining a roundtrip transit time over the Ethernet communication link utilizing the time stamped packets exchanged between the baseband circuitry and the radio circuitry via the Ethernet communication link; and
  determining the phase offset based on the roundtrip transit time.

13. A wireless communication device, comprising:
  a baseband module configured to perform signal processing on a data stream;
  a radio module configured to wirelessly transmit the data stream; and
  an Ethernet communication link communicatively coupling the baseband module to the radio module, wherein a first clock frequency and a first clock phase of the baseband module and a second clock frequency and a second clock phase of the radio module are synchronized via the Ethernet communication link, wherein the synchronization of the second clock phase of the radio module with the first clock phase of the baseband module includes determining a phase offset between the first clock phase and the second clock phase utilizing a time stamped packet sent by the baseband module to the radio module via the Ethernet communication link and returned by the radio module to the baseband module via the Ethernet communication link.

14. The wireless communication device of claim 13, wherein the first clock frequency of the baseband module and the second clock frequency of the radio module are synchronized utilizing a hierarchical master-slave architecture.

15. The wireless communication device of claim 14, wherein the baseband module further comprises:
  a delay measurement module configured to measure a delay through a nondeterministic component of at least one component from the baseband module.

16. The wireless communication device of claim 15, wherein the delay measurement module is configured to:
  first detect a predetermined code in a data stream before processing by the nondeterministic component,
  second detect the predetermined code in the data stream after processing by the nondeterministic component, and
  measure a time difference between the first detection and the second detection to measure the delay.

17. The wireless communication device of claim 13, wherein the baseband module further comprises:
  a clock and data recovery (CDR) unit configured to receive a grandmaster clock and to recover the first clock frequency and the first clock phase of the baseband module from the received grandmaster clock; and
  a clock generation unit configured to generate a baseband reference clock based on the recovered first clock frequency and the recovered first clock phase of the baseband module.

18. The wireless communication device of claim 13, wherein the radio module further comprises:
  a clock and data recovery (CDR) unit configured to receive a signal from the baseband module and to recover the second clock frequency and the second clock phase of the radio module from the received signal; and
  a clock generation unit configured to generate a radio reference clock based on the recovered second clock frequency and the recovered second clock phase of the radio module.

19. The wireless communications device of claim 13, wherein the synchronization of the second clock phase of the radio module with the first clock phase of the baseband module further includes:

determining a roundtrip transit time over the Ethernet communication link utilizing the time stamped packets exchanged between the baseband module and the radio module via the Ethernet communication link, and determining the phase offset based on the roundtrip transit time.

20. A method of wireless communication utilizing baseband circuitry in communication with radio circuitry via an Ethernet communication link, the method comprising:

recovering a first clock frequency at the baseband circuitry from a grandmaster clock, wherein the baseband circuitry receives the grandmaster clock utilizing a hierarchical master-slave architecture;

synchronizing a first internal reference clock of the baseband circuitry based on the recovered first clock frequency;

recovering a second clock frequency at the radio circuitry from a signal received from the baseband circuitry, the recovering of the second clock frequency utilizing the hierarchical master-slave architecture, wherein the recovered second clock frequency is frequency locked to the grandmaster clock; and synchronizing a second internal reference clock of the radio circuitry based on the second clock frequency recovered at the radio circuitry;

wherein synchronizing a first clock phase of the first internal reference clock of the baseband circuitry and a second clock phase of the second internal reference clock of the radio circuitry, wherein the synchronizing the first clock phase comprises:

determining a phase offset utilizing time stamped packets exchanged between the baseband module and the radio module via the Ethernet communication link, and measuring a delay through a nondeterministic component of at least one component of the baseband circuitry or the radio circuitry.

* * * * *

UNITED STATES PATENT AND TRADEMARK OFFICE
CERTIFICATE OF CORRECTION

| | |
|---|---|
| PATENT NO. | : 9,301,267 B2 |
| APPLICATION NO. | : 13/763426 |
| DATED | : March 29, 2016 |
| INVENTOR(S) | : Timothy Ryan |

Page 1 of 1

It is certified that error appears in the above-identified patent and that said Letters Patent is hereby corrected as shown below:

Claims

In column 20, line 7, claim 20, please replace "wherein synchronizing" with --synchronizing--.

Signed and Sealed this
Seventh Day of June, 2016

Michelle K. Lee
*Director of the United States Patent and Trademark Office*